June 16, 1936. W. FOURNESS ET AL 2,044,068
TEMPERATURE CONTROL SYSTEM FOR VEHICLES
Filed Jan. 3, 1933 5 Sheets-Sheet 3

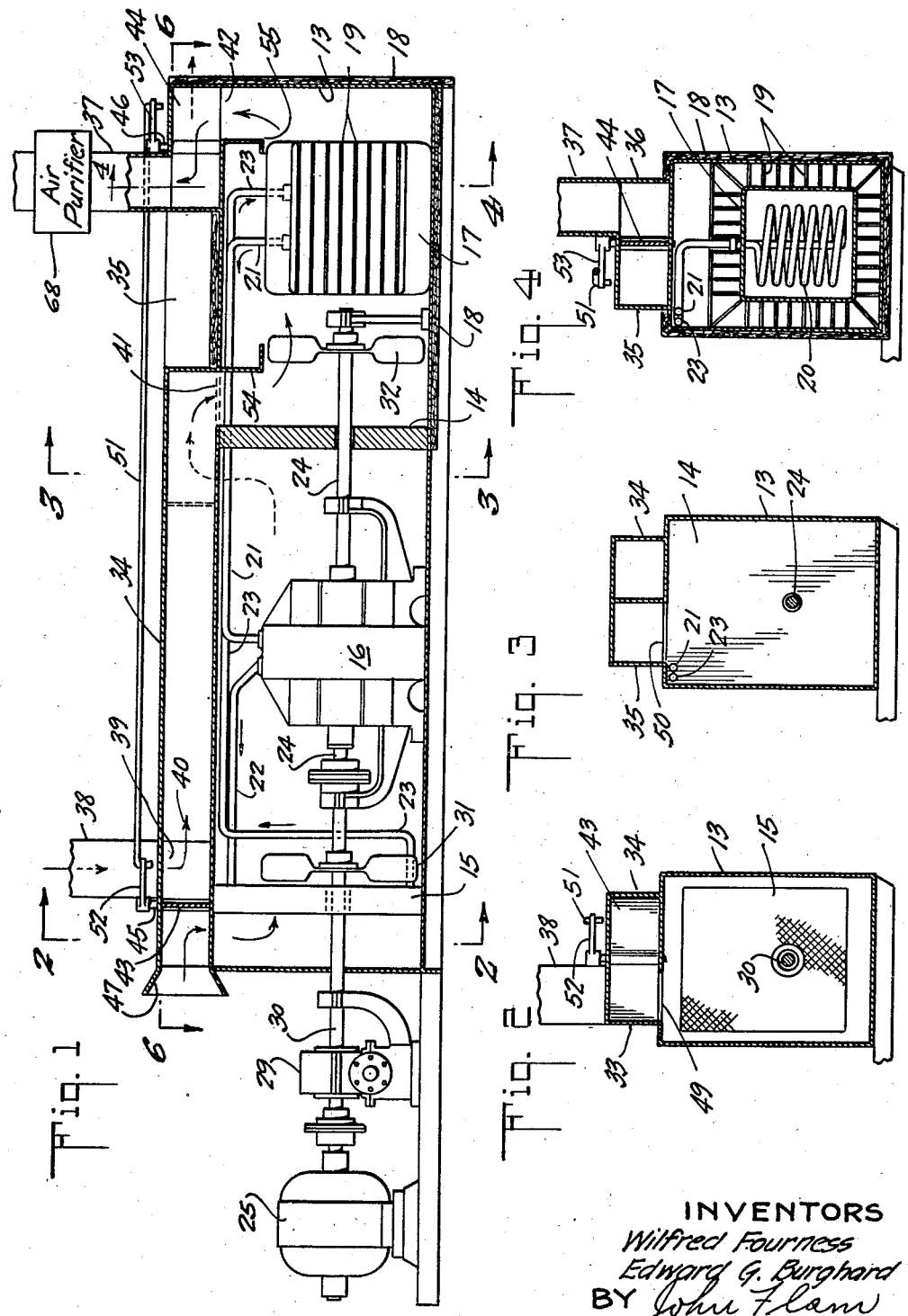

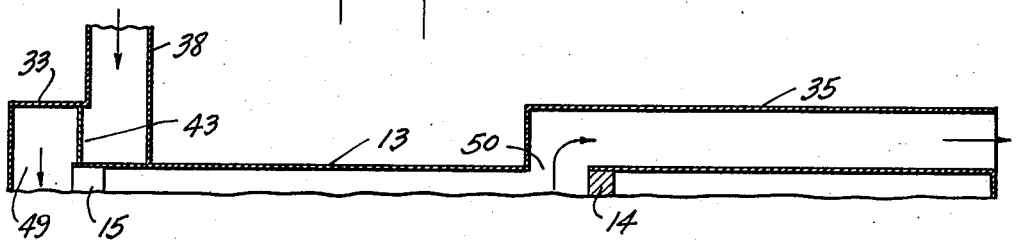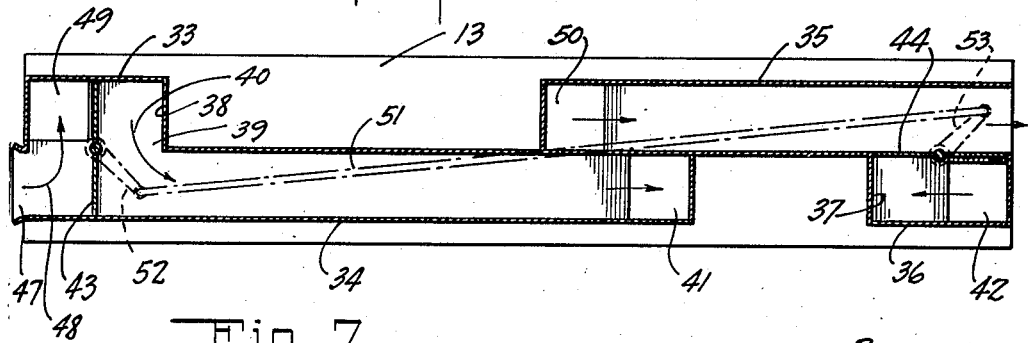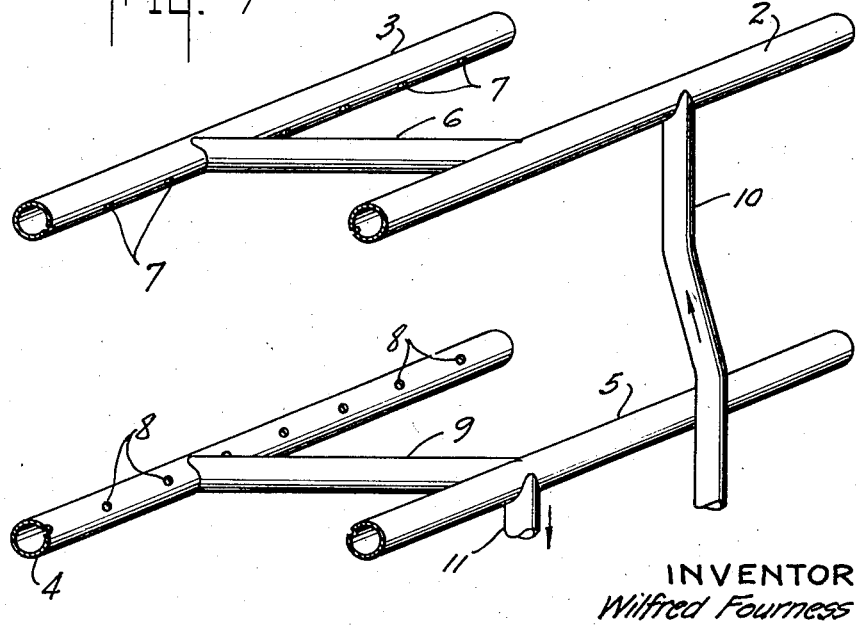

INVENTORS
Wilfred Fourness
Edward G. Burghard
BY John Flam
ATTORNEY

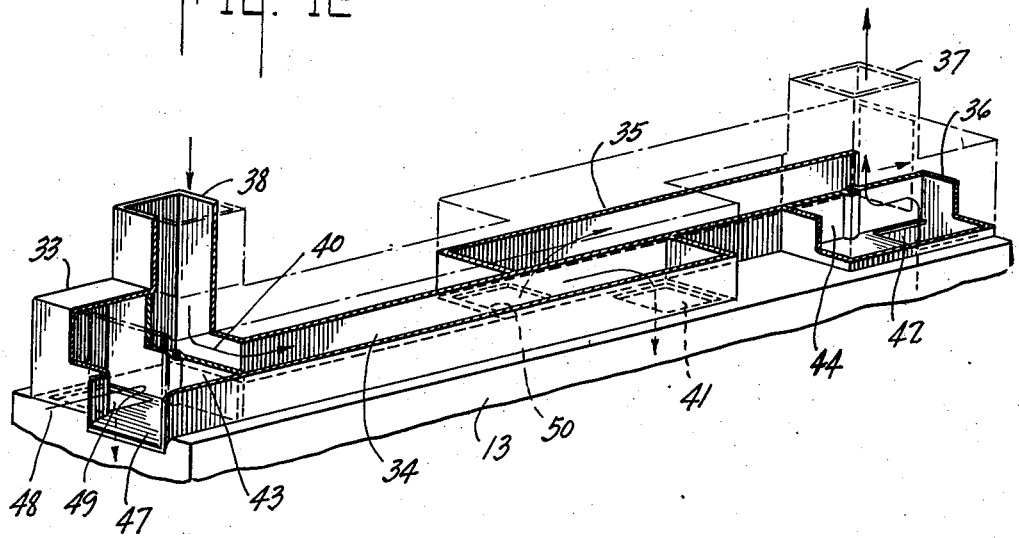
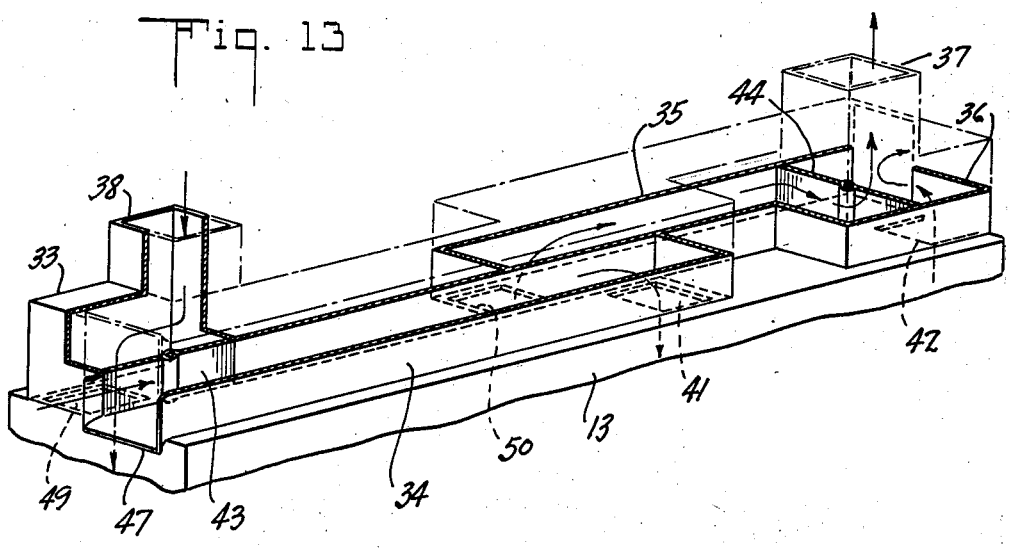

June 16, 1936.  W. FOURNESS ET AL  2,044,068
TEMPERATURE CONTROL SYSTEM FOR VEHICLES
Filed Jan. 3, 1933   5 Sheets-Sheet 5

INVENTORS
Wilfred Fourness
Edward G. Burghard
BY John Flam
ATTORNEY

Patented June 16, 1936

2,044,068

UNITED STATES PATENT OFFICE 2,044,068

TEMPERATURE CONTROL SYSTEM FOR VEHICLES

Wilfred Fourness, Oakland, Calif., and Edward G. Burghard, New York, N. Y., assignors, by mesne assignments, to Fourness Development Corporation, Ltd.

Application January 3, 1933, Serial No. 649,912

9 Claims. (Cl. 62—129)

This invention relates to a system for controlling or conditioning the air inside of a passenger vehicle, such as an automobile, motor coach, or railroad car.

Travelling in such passenger conveyances is often uncomfortable; and although several factors may and usually do contribute to the passengers' discomfort, not among the least of these factors is the lack of regard paid to the temperature of the air inside of the conveyance. In the summer time, the conveyances are notoriously hot and stuffy; and in the winter time, inadequate or unregulated heating is provided, conducive to drafts and attendant exposure of the passengers to annoying illnesses and colds. In general, little, aside from makeshift or haphazard attempts have been made in the past to "normalize" these air conditions; which are so important, not only from the standpoint of comfort, but of health as well.

Recently some attention has been paid to railway car air conditioning; but such installations have not been as yet generally adopted. This is due to the fact that cumbersome, expensive equipment is necessary, for rendering the system entirely practical. And such forms of equipment are not at all adapted for ordinary pleasure automobiles or motor coaches.

It is one of the objects of this invention to provide a simple and inexpensive system for controlling the interior temperature of such conveyances, and especially one that can readily be installed, not only on railway cars, but also on passenger automobiles.

In general, the system of this invention contemplates the use of a mechanical refrigerating system, including a power driven compressor. This system can be used either for raising or lowering the air temperature as desired. Thus if a lowering is desired, the cooling coil of the system can be so arranged as to absorb heat from air circulated past it and through the passenger compartment. If a rise in temperature is desired, the cooling effect is used to abstract heat from air outside of the conveyance, and this heat, so abstracted, plus the heating of the compressor due to the mechanical load imposed upon it, is transferred to air circulated through the passenger compartment.

It is accordingly another object of this invention to provide a convertible system of this character.

It is still another object of this invention to make it possible in a simple manner, to convert the system from a cooling system to a heating system, or vice versa.

This invention possesses many other advantages, and has other objects which may be made more easily apparent from a consideration of several embodiments of the invention. For this purpose there is shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Figure 1 is an elevation of the apparatus comprising the refrigerating system and its source of power, the housing for the apparatus being shown in section;

Figs. 2, 3 and 4 are cross sectional views, taken respectively along planes 2—2, 3—3 and 4—4 of Fig. 1;

Fig. 5 is a fragmentary vertical section showing a portion of the conduits used in connection with the system;

Fig. 6 is a horizontal sectional view taken along plane 6—6 of Fig. 1;

Fig. 7 is a perspective view of the pipe or conduit installation in the space, the temperature of which is to be controlled;

Figs. 12 and 13 are pictorial diagrams illustrating the position of the apparatus, respectively for cooling the air in the conveyance, and for heating the air in the conveyance;

Figure 8:
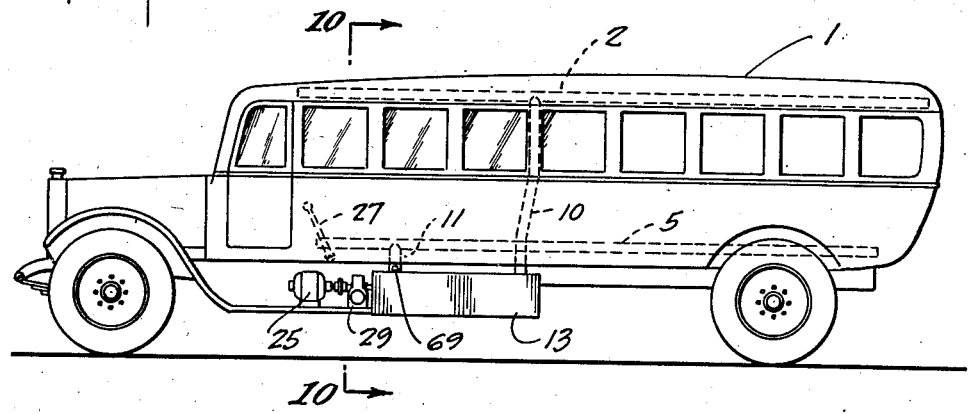
Fig. 8 is a diagrammatic side elevation of a motor coach embodying the invention.
Figure 9:
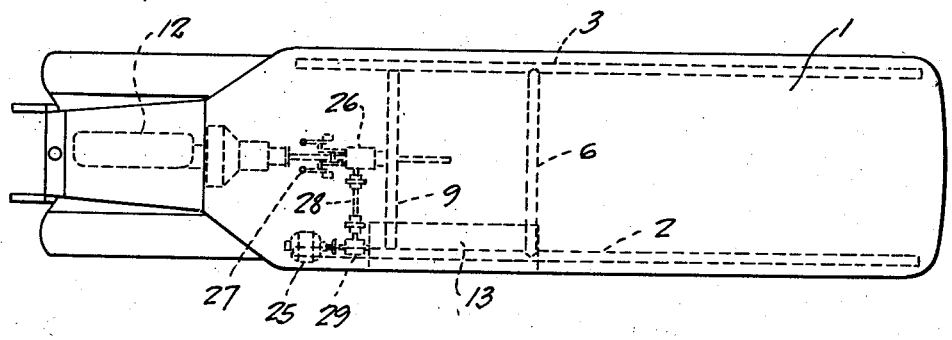
Fig. 9 is a plan view thereof.
Figure 10:
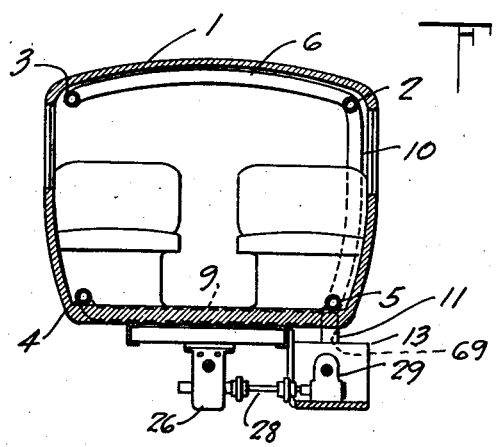
Fig. 10 is a sectional view taken along plane 10—10 of Fig. 8.

In the form of the invention illustrated in Figs. 1 to 13, inclusive, the temperature control system is adapted to be installed on a motor coach 1 (Figs. 8, 9, 10). As viewed most clearly in Figs. 7 and 10, conduits for circulating air in the space defined by the coach body are provided. Thus at each of the upper corners and running lengthwise of the coach body are a pair of conduits 2 and 3. Similarly, in the lower corners of the coach body are located longitudinally extending conduits 4 and 5.

The conduits 2 and 3 can be connected together as by the cross conduit 6, and can be provided with downwardly and inwardly extending openings 7 for the passage of air from these conduits into the motor coach body. The lower conduits 4 and 5 are similarly provided with apertures 8, which are directed upwardly and inwardly, to permit air from the coach body to enter conduits 4 and 5. These conduits may be connected together, as by cross conduit 9.

Upright conduits 10 and 11 connect respectively with the upper and lower system of conduits. These upright conduits 10 and 11 extend through the floor of the motor coach body to a system which passes air through the upright conduit 10 and receives air from the upright conduit 11. Air is thus continually withdrawn near the bottom of the motor coach body and supplied to it near the top thereof, although this arrangement may be reversed. As described hereinafter, a definite circulation of the air through conduits 10, 2, 3, 4, 5 and 11 is provided for by appropriate fans. At the present time it is sufficient to note that the air supplied to the coach body may be either cooled air or heated air. In this way normal temperature condition may be provided in the coach body irrespective of external temperatures. The cooling or heating of the air supplied to the conduit 10 is preferably accomplished by the aid of a heat exchange system operated by the propelling engine 12 (Fig. 9) of the motor coach. This heat exchange system is preferably in the form of a mechanical refrigerating system, utilizing a refrigerant which evaporates from a liquid state for heat absorption, and which is thereafter compressed and recondensed. The recondensed or liquefied refrigerant is then repeatedly passed through the same cycle. Since this type of mechanical refrigeration is now well understood, further explanation thereof is considered unnecessary.

This mechanical refrigerating system can be so arranged that heat is absorbed from the air taken from the body of the coach 1 into the refrigerant; or alternatively, the heat absorbed by the refrigerant from the external air, as well as heat generated by mechanical work necessary for compressing the gas, can be transferred to the air withdrawn from the coach.

Before describing how this can be accomplished, a more detailed description of the mechanism comprising the refrigerating system will be set forth. This system is shown as housed in a housing 13 (Figs. 1, 2, 3, 4, 8, 9 and 10). This housing can be formed of appropriate thin metal and can be supported as illustrated in Fig. 10 at one side of and below the coach body. An intermediate partition 14 (Fig. 1), preferably of heat insulation material, separates the housing into two spaces, for housing respectively the condenser 15 and compressor 16 in the left hand compartment; and for housing the heat absorbing unit 17 in the right hand compartment. This right hand compartment, furthermore, can be overlaid with one or more layers of heat insulation material, such as 18.

The heat absorbing unit 17 is shown in this instance as being substantially rectangular (Fig. 4) and made of metal. A plurality of vanes or fins 19 can be placed longitudinally all around the body of member 17 to provide passages for air drawn past member 17; as well as for exposing a large surface for effective heat exchange between member 17 and the air in contact therewith. Inside the member 17 there is an expansion coil 20 in which liquid refrigerant is arranged to evaporate for absorbing heat from the heat absorbing member 17. This coil can be surrounded by any appropriate fluid if desired, which can be enclosed in member 17.

Figure 11:
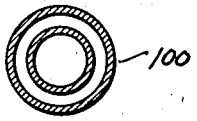
Fig. 11 is a diagrammatic section showing how the refrigerant conducting pipes can be maintained against accidental leaks.

The expanded or vaporized refrigerant is conducted from the coil 20 through a conduit 21 to the intake of compressor 16. Compressor 16 acts to compress the gas, doing mechanical work thereon and thereby raising its temperature. The compressed gas passes from the compressor 16 through pipe 22 into the condenser 15. This condenser is cellular for permitting a draft of cooling air to pass through it and to abstract heat from the gas. The liquefied refrigerant at the bottom of the condenser is then passed through a conduit 23, back to the coil 20, and the cycle is then repeated. For the sake of clarity, various controlling valves automatically regulating the quantity of refrigerant passing to or from the expansion coil 20 have been omitted; but it is understood that these elements may be used if desired. Furthermore, to ensure against leakage of refrigerant, the conduits in which such refrigerant passes between the elements of the system, can be surrounded by a supplemental conduit, as illustrated at 100 (Fig. 11).

The mechanical power for driving the shaft 24 of the compressor is preferably derived from the propelling engine 12. In the present instance a supplemental or alternative source of power is provided, such as the electric motor 25. This electric motor is located outside of casing 13 and to the left thereof as viewed in Figs. 1 and 8. The mechanical details of the drive for this compressor can be substantially the same as that disclosed in the copending application filed in the name of Wilfred Fourness and Edward G. Burghard on December 2, 1932, Serial No. 645,370, and entitled Refrigerator truck.

It is sufficient merely to note that transmission gearing is provided in a housing 26 (Figs. 9 and 10) deriving its power from the engine 12 and controlled by a clutch mechanism manually controllable as by hand lever 27 (Fig. 9). The gear in housing 26 drives a transverse shaft 28 which extends into another housing 29 (Figs. 1 and 10). In this housing gearing is provided for driving a shaft 30 in axial alignment with shaft 24 of the compressor 16. The motor 25 can be coupled to this shaft 30 for driving it; and as explained in the prior application referred to, overrunning clutches can be provided, so arranged as to make it possible to drive compressor shaft 24 from either source of power without interference from the other source of power. Shaft 24 and shaft 30 can be appropriately coupled together, so that the compressor 16 is mechanically operated.

In order to create a draft of air past the condenser 15 a suction fan 31 can be mounted on shaft 30. Similarly, a fan 32 can be provided at the right hand end of shaft 24 for blowing air past the heat absorbing member 17, and between the vanes 19.

There will now be described the members forming the various passageways whereby air cooled by passage over the member 17 can be circulated through the coach body; and alternatively, whereby air drawn from the coach body can be passed through the condenser 15 and around compressor 16, receiving heat therefrom, whereby the interior of the coach may be warmed.

In order to explain these features, reference can be had more particularly to Figs. 1 to 6, inclusive, and Figs. 12 and 13. It is seen by the aid of these figures, and particularly by the aid of Fig. 6, that on top of the casing 13 are disposed conduits forming horizontal passageways. These conduits are formed in this instance by the aid of sheet metal, and in general comprise four sections. One short section 33 is adjacent a long intermediate section 34. A third section 35 overlaps this intermediate section 34; and a fourth short section 36 is adjacent the right hand end of the section 35. Sections 34 and 36 in the present instance are shown as being on the right hand side of Figs. 2, 3, and 4; and all of the sections are immediately above the top of the housing 13.

Various openings extend between some of these sections, as well as into the housing 13, and will be described hereinafter, for appropriate transfer of the circulated air through the various compartments. It is sufficient to note at the present time that an upright conduit 37 (Figs. 1, 4, 6, 12 and 13) extends upwardly from the section 36 and communicates with the upright conduit 10 for leading air into the coach body. Similarly, an upright conduit 38 (Figs. 1, 2, 5, 12 and 13) extends upwardly from the section 33 and communicates with the downwardly directed conduit 11 for extracting air from the coach body.

The circulation of the air from the coach body for cooling it through the various passageways will now be described. The air entering conduit 11 from the interior of the coach body passes downwardly in conduit 38. From conduit 38 the air passes into the section 33. Then it passes in a transverse direction as shown in Fig. 6 into section 34 through a passage 39 as indicated by the arrow 40 (Figs. 6 and 12). The air then proceeds through section 34 and enters the right hand compartment of the housing 13, through a downwardly directed passageway 41. The fan 32 serves to draw the air in this direction. The air is drawn past or between the vanes 19 of the member 17 and is passed upwardly through an opening 42 into section 36. It passes along this section, and thence upwardly to conduit 37 which connects to pipe 10. Cooling is thus provided for this circulating air.

It is noted that the passage between sections 33 and 34 is controllable by a butterfly valve 43. This valve 43 is in a direction transverse to both sections 33 and 34 to confine the passage of the air from section 33 to section 34. Similarly, another butterfly valve 44 is longitudinally positioned between sections 35 and 36 so as to confine the passage of the air which proceeds upwardly through opening 42, to the section 36. Both of these butterfly valves are shown as pivotally mounted on vertical axes. These axes are substantially central between the corresponding sections 33, 34, and 35, 36. The shafts 45 and 46 of these butterfly valves are shown most clearly in Fig. 1, and extend upwardly through the walls of the conduits for ease of manual control.

The positions of these butterfly valves are such that continuous passageways for the circulation for cooling it are obtained. At the same time, the same positions make it possible for air to enter from the outside into the left hand compartment of housing 13 to cool the condenser 15 and compressor 16. The progress of this air can now be set forth.

Air enters through the bell mouth 47 at the left hand side of the apparatus as viewed in Fig. 1. Thence the air encounters the butterfly valve 43 and is directed transversely to the left hand half of section 33 as indicated by the arrow 48 (Figs. 6 and 12). Thence the air proceeds downwardly through the opening 49 into the left hand compartment of housing 13, and is drawn through the openings in condenser 15, and past the compressor 16, by the aid of the fan 31. Thence the air passes upwardly through the opening 50 into section 35, and then outwardly longitudinally of this section to the exterior air, at the right hand end of this section.

For heating the air that is circulated in the coach body, the air is passed through the condenser 15 and past the compressor 16; in other words the circulated air is passed into the left hand compartment of housing 13. This condition is illustrated in Fig. 13. In that position the butterfly valve 43 is in longitudinal position; or horizontal as viewed in Fig. 6, while butterfly valve 44 is in upright position. Under such conditions, the air from the coach body proceeds through pipe 11 into conduit 38. Thence it passes longitudinally along section 33 and down through the opening 49, the butterfly valve 43 being in such position that it does not impede the passage of the air in this manner. From opening 49 the air is drawn past the condenser 15 and compressor 16, where it has an opportunity to absorb heat from these elements. Thence the air passes through opening 50 and upwardly into section 35. Thence it passes transversely along this section as far as the left hand side of butterfly valve 44, and into the section 36. Thence it passes upwardly through conduit 37 and to the pipe 10.

For this position of the valves, external air is taken in and passes through the cooling compartment in housing 13, whereby heat from this exterior air is absorbed, which heat may be used to raise the temperature of the condenser 15 and compressor 16. Thus external air as before enters the bell mouth 47. Thence it passes longitudinally through section 34, and downwardly through opening 41 into the cooling compartment. Thence it progresses upwardly through opening 42 and passes on the right hand side of the butterfly valve 44 into section 35, and thence out into exterior air through the right hand opening of the section 35.

Butterfly valves 43 and 44 are arranged for simultaneous control as by the aid of link 51 (Figs. 1 and 6). This link is connected to arms 52 and 53 joined respectively to the shafts 45 and 46 of the valves. It is apparent that manual operation of link 51, will cause the valves 43, 44 to be placed in either of the positions of Figs. 12 and 13. Appropriate restraints may be utilized to maintain these adjustments until they are purposely altered.

If desired, an air purifier device 68 (Fig. 1), can be included in the system; for example, in conduit 37. This device can be arranged to disinfect or otherwise treat the air.

In order more completely to confine the passage of the air between the vanes 19, supplemental partitions such as 54 and 55 (Fig. 1) can be provided in the right hand compartment of the housing 13.

Figure 14:
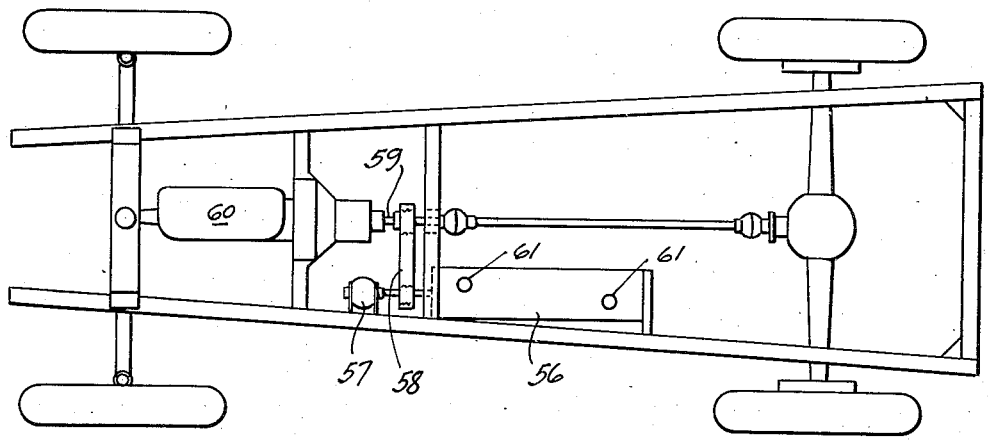
Fig. 14 is a plan view of a chassis for a pleasure vehicle, illustrating how the heat exchange system for the practice of this invention may be supported and operated.

The system just described has been specifically shown as adapted to a motor coach. However, the same type of installation can be used in a pleasure automobile. The chassis of such a pleasure automobile is shown in Fig. 14. The housing 56 accommodating the heat exchange system can be supported underneath the body and between the longitudinal frames of the chassis. The source of power can be either the electric motor 57 or a belt drive 58 from the power shaft 59 of the propelling engine 60. The passageways 61 in the top of the housing 56 can be connected to appropriate conduits for providing circulation of air into the car.

Figure 15:
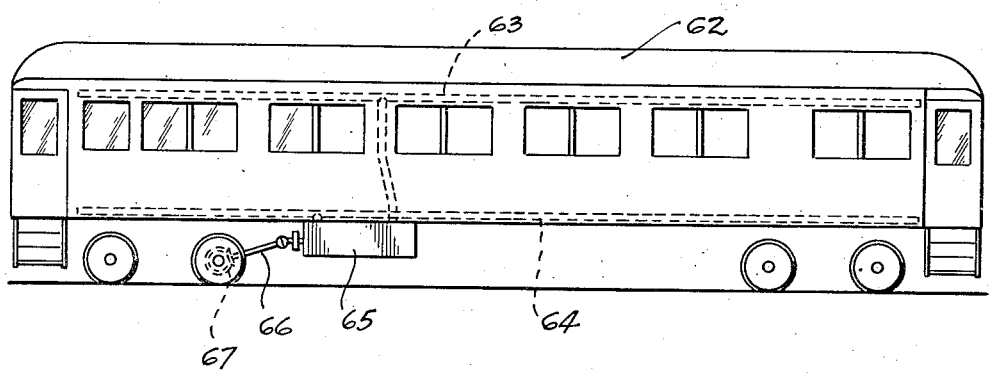
Fig. 15 is a diagrammatic side elevation of a railway car in which the invention may be incorporated.

In Fig. 15, a railway passenger car is shown in diagrammatic form. In this case, the longitudinally extending conduits 63 and 64 for passing cooled or heated air through the railway car are connected to a housing 65. Inside of this housing 65 are supported the elements of the heat exchange system. The power for operating the system can conveniently be provided by the aid of the shaft 66 and gear 67 driven from one of the wheel axles.

In all of the forms described, it may be advisable at times to permit air to enter the system from the exterior. This can be accomplished automatically as by a valve 69 (Fig. 10) inside of an intake conduit 11. When the air pressure inside of the vehicle is substantially less than on the outside, valve 69 opens to the position shown, and permits sufficient air to enter to reestablish substantial equilibrium.

We claim:

1. In a system for temperature control for air in a space, a mechanical refrigerating system having a heat absorbing member, a compressor and a condenser for circulating a refrigerant through said member and condenser, means for circulating air through said space, and means for optionally passing said air past said heat absorbing member, to transfer heat from the air to the member, while circulating external air over the condenser and compressor, and for passing said air to be conducted into the said space past the condenser and compressor to transfer heat from the condenser and compressor to the air, while circulating external air over the heat absorbing member.

2. In a system for temperature control for air in a conveyance, an air intake conduit in the conveyance, an air outlet conduit in the conveyance, and a heat exchange system including a compressor and a heat absorbing member, operated by the motive power of the conveyance and in heat exchanging relationship to the air passing through the conduits, means for reversing the operation of said heat exchange system, and means for optionally circulating external air over the compressor or the heat absorbing member.

3. In a system for temperature control for air in a conveyance having a source of propelling power, an air inlet conduit in the conveyance, an air outlet conduit in the conveyance, a mechanical refrigerating system having a compressor, a condenser, a heat absorbing member, as well as a refrigerant circulating through the compressor, condenser and heat absorbing member, means for operating said compressor by power derived from the source of propelling power, and means for circulating air through said conduits optionally to transfer heat to said heat absorbing member while circulating external air over said compressor, or to receive heat from said condenser and compressor, while circulating external air over said heat absorbing member.

4. In a system for temperature control for air in a space, a mechanical refrigerating system having a heat absorbing member, a refrigerant evaporating in said member, as well as means for reliquefying and absorbing heat from the evaporated refrigerant, means forming a passageway past the heat absorbing member, means forming a passageway past the means for liquefying and absorbing heat from the refrigerant, and means whereby air from the space is circulated through either of said passageways, while external air is circulated through the other of said passageways.

5. In a system for temperature control for air in a space, a mechanical refrigerating system having a heat absorbing member, a refrigerant evaporating in said member, as well as means for reliquefying and absorbing heat from the evaporated refrigerant, means forming a passageway past the heat absorbing member, means forming a passageway past the means for liquefying and absorbing heat from the refrigerant, and means whereby air from the space is circulated through either of said passageways, and external air is passed through the other passageway.

6. In a system for temperature control for air in a space, a mechanical refrigerating system for circulating a refrigerant through a member where it evaporates for absorbing heat, said system having a compressor and a condenser for reliquefying said refrigerant after it has passed through said member, means forming separate compartments respectively for the member, and for the condenser and compressor, means forming a passageway for air through the compartment in which said member is located, means forming a passageway for air through the compartment where the condenser and the compressor are located, conduits for circulating air in the space, and means for connecting said conduits for passing air optionally through either passageway and leaving the other passageway open for the circulation of external air.

7. In a system for temperature control for air in a space, a mechanical refrigerating system for circulating a refrigerant through a member where it evaporates for absorbing heat, said system having a compressor and a condenser for reliquefying said refrigerant after it has passed through said member, means forming separate compartments respectively for the member, and for the condenser and compressor, means forming a passageway for air through the compartment in which said member is located, means forming a passageway for air through the compartment where the condenser and the compressor are located, conduits for circulating air in the space, and valves for controlling the connection of said conduits to either passageway, and for controlling the connection of the other of the passageways to the external air.

8. In a system for temperature control for air in an automobile, having a source of propelling power, a mechanical refrigerating system for circulating a refrigerant through a member where it evaporates for absorbing heat, said system having a compressor and a condenser for reliquefying said refrigerant after it has passed through said member, means for driving said compressor from the source of propelling power, means forming separate compartments respectively for the member, and for the compressor and condenser, means forming a passageway for air through the compartment in which said member is located, means forming a passageway for air through the compartment where the condenser and the compressor are located, conduits in the automobile for circulating air in the passenger compartment, and means for connecting said conduits for passing air optionally through either passageway and leaving the other passageway open for the circulation of external air.

9. In a system for temperature control for air in an automobile, having a source of propelling power, a mechanical refrigerating system for circulating a refrigerant through a member where it evaporates for absorbing heat, said system having a compressor and a condenser for reliquefying said refrigerant after it has passed through said member, means for driving said compressor from the source of propelling power, means forming separate compartments respectively for the member, and for the compressor and condenser, means forming a passageway for air through the compartment in which said member is located, means forming a passageway for air through the compartment where the condenser and the compressor are located, conduits in the automobile for circulating air in the passenger compartment, and valves for controlling the connection of said conduits to either passageway, and for controlling the connection of the other of the passageways to the external air.

EDWARD G. BURGHARD.
WILFRED FOURNESS.